United States Patent
Hayashi

(10) Patent No.: US 7,137,425 B2
(45) Date of Patent: Nov. 21, 2006

(54) HIGH-PERFORMANCE, LOW PROFILE TIRE FOR FOUR-WHEELED PASSENGER CAR AND METHOD OF MOUNTING THE TIRE

(75) Inventor: Kazuo Hayashi, Kodaira (JP)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 11/259,078

(22) Filed: Oct. 27, 2005

(65) Prior Publication Data

US 2006/0096686 A1 May 11, 2006

(30) Foreign Application Priority Data

Nov. 10, 2004 (JP) ............................. 2004-326891

(51) Int. Cl.
- *B60C 15/06* (2006.01)
- *B60C 15/00* (2006.01)
- *B60C 3/04* (2006.01)

(52) U.S. Cl. ............... 152/454; 152/541; 152/542; 152/543; 152/546; 152/554; 280/86.751

(58) Field of Classification Search ........ 152/541–543, 152/546, 454, 554; 280/86.751
See application file for complete search history.

(56) References Cited

U.S. PATENT DOCUMENTS 5,526,863 A * 6/1996 Hodges ................. 152/541
5,698,051 A * 12/1997 Tanaka ................ 152/541 X

FOREIGN PATENT DOCUMENTS

JP 2002-67616 A 3/2002

* cited by examiner

*Primary Examiner*—Adrienne C. Johnstone
(74) *Attorney, Agent, or Firm*—Sughrue Mion, PLLC

(57) ABSTRACT

A high-performance, low-profile tire for four-wheeled passenger car comprises a carcass comprised of at least two carcass cord plies each extending between a pair of bead cores and wound around the respective bead core from an inside of the tire toward an outside thereof, a belt, a tread rubber, a bead apex extending outward from the bead core in the radial direction of the tire and having a tapered sectional form, a flipper arranged outside the carcass in the radial direction of the tire and wound around the bead core and bead apex from an inside of the tire toward an outside thereof, and at least one bead-side reinforcing layer arranged to pass between a turnup portion of the flipper and the bead apex and extend up to a vicinity of a tire maximum width, and has an aspect ratio of 35–55%.

2 Claims, 2 Drawing Sheets

HIGH-PERFORMANCE, LOW PROFILE TIRE FOR FOUR-WHEELED PASSENGER CAR AND METHOD OF MOUNTING THE TIRE

BACKGROUND OF THE INVENTION

1. Field of the Invention

This invention relates to a high-performance, low-profile tire for four-wheeled passenger car having an aspect ratio of 35–55%, and more particularly to a tire wherein the rise of the vertical spring constant of the tire is suppressed and the lateral spring constant thereof is properly raised to improve the steering stability in the high-speed cornering and also the peripheral length in the ground contact face of the tire is ensured to maintain the ground contacting property to thereby improve the traction transmitting force (acceleration performance).

2. Related Art

Recently, it is strongly demanded to improve the steering performances of the tire, particularly the steering stability accompanied with the advance of the performances in the vehicle.

As a low-profile radial tire for a passenger car having an aspect ratio H/W of tire section height H to tire maximum width W of not more than 0.60, there is known a tire structure improving the steering performances that a carcass is comprised of a carcass cord ply having a main body portion and a turnup portion connecting with the main body portion and wound around a bead core from an inside of the tire toward an outside thereof and a carcass cord ply consisting of only a main body portion terminated outside the above carcass cord ply without winding around the bead core and a spacer rubber is interposed between the main body portions of the two carcass cord plies in a zone ranging from an axially outer end of a belt to a maximum width position being a maximum width of the tire to form a ply-separating portion in which a distance between cords of the adjoining main body portions is 0.55–5.5 times of a cord diameter (see JP-A-2002-67616).

In such a conventional low-profile tire, it is said that since the ply-separating portion is formed between the adjoining carcass cord plies in the zone ranging from the outer end portion of the belt to the tire maximum width position, it is possible to improve the steering performances and also the tire weight can be reduced.

However, this tire has a problem that the absorbability of vibrations input from a road surface is low and the steering stability in the high-speed cornering (road holding property) is poor because a flex zone in the vicinity of the carcass shoulder is excessively reinforced accompanied with the reinforcement of the zone ranging from a bead portion to a side portion.

SUMMARY OF THE INVENTION

The invention is to provide a new low-profile tire capable of improving the steering stability in the high-speed cornering and the traction transmission force (acceleration performance) by combining materials having an adequate strength in proper structure and form while avoiding the excessive reinforcement in unwanted portions.

According to the invention, there is the provision of a high-performance, low-profile tire for four-wheeled passenger car comprising a carcass comprised of at least two carcass cord plies each having a relatively high elasticity and consisting of a main body portion extending from a tread portion through a sidewall portion to a bead core in a bead portion and a turnup portion continuing from the main body portion and wound around the bead core from an inside of the tire toward an outside thereof, a belt comprised of high elasticity cord layers arranged on an outside of the carcass in a radial direction of the tire at a width approximately equal to a tread rubber, a tread made of a tread rubber arranged on an outside of the belt in the radial direction of the tire, a bead apex extending outward from the bead core in the radial direction of the tire and having a tapered sectional form, a flipper comprised of at least one layer of high elasticity cords arranged outside the carcass in the radial direction of the tire and wound around the bead core and bead apex from an inside of the tire toward an outside thereof, and at least one bead-side reinforcing layer of high elasticity cords arranged to pass between a turnup portion of the flipper and the bead apex and extend up to a vicinity of a tire maximum width, and having an aspect ratio of 35–55%, in which each of said carcass, belt, flipper, bead-side reinforcing layer and bead apex satisfies the following conditions:

Carcass: at least two plies each containing rubberized textile cords having a tensile strength at break of not less than 4.5 cN/dtex arranged at an angle of 70–90° with respect to a circumferential direction of the tire, cord arranging directions of which plies being different from each other, and having a turnup end at a height corresponding to 60–80% of a tire section height (SH: defined by a half of a value obtained by subtracting a normal rim from an outer diameter of the tire);

Belt: at least a pair of layers each containing rubberized textile cords having a tensile strength at break of not less than 6.0 cN/dtex arranged at an angle of 15–30° with respect to the circumferential direction of the tire, cords of which layers being crossed with each other, in which each end portion of the layer located at an upper side is enclosed with an upwardly folded end portion of the layer located at a lower side;

Flipper: at least one layer containing rubberized textile cords having a tensile strength at break of not less than 6.0 cN/dtex arranged at an angle of 35–60° with respect to the circumferential direction of the tire, and having a radially inside end height corresponding to 55–75% of the tire section height and a radially outside end height corresponding to 25–45% of the tire section height and lower than a height of the bead-side reinforcing layer;

Bead-side reinforcing layer: at least one layer containing rubberized textile cords having a tensile strength at break of not less than 6 cN/dtex arranged at an angle of 5–45° with respect to the circumferential direction of the tire and in the same direction as the cord extending direction of the inside portion of the flipper, in which a lower end has a height approximately equal to a rim flange of the rim and an upper end has a height corresponding to 50–70% of the tire section height and being lower than the turnup end of the carcass;

Bead apex: rubber having a JIS A hardness at room temperature of 75–95° and a height extending from an outer peripheral face of the bead core to a position corresponding to 50–70% of the tire section height but not exceeding the turnup end of the carcass, in which a thickness of a lower end at a section in the radial direction of the tire is approximately equal to a width of the bead core and a thickness at least ranging from the lower end up to a position corresponding to 25–30% of the tire section height is 70–100% of the thickness of the lower end and has a thickness reducing ratio of 0–0.05% per unit height and a thickness of an upper region at least exceeding 30% of the tire section height is 70–10% of the thickness of the lower end and has a thickness reducing ratio of 0.05–0.2% per unit height.

The tire having the above construction is mounted on a wheel shaft of a vehicle having a negative camber alignment so that the cords of the flipper inside portion and the bead-side reinforcing layer at least located at an inside of the tire mounted on the vehicle are inclined in a direction withstanding a rotating stress applied from a road surface to the tire viewing from a side of the bead core.

In the tire according to the invention, the lateral spring constant can be properly raised while suppressing the rise of the vertical spring constant, so that the steering stability in the high-speed cornering is improved but also the acceleration performance is improved.

BRIEF DESCRIPTION OF THE DRAWINGS

The invention will be described with reference to the accompanying drawings, wherein.

BEST MODE FOR CARRYING OUT THE INVENTION

Figure 1:
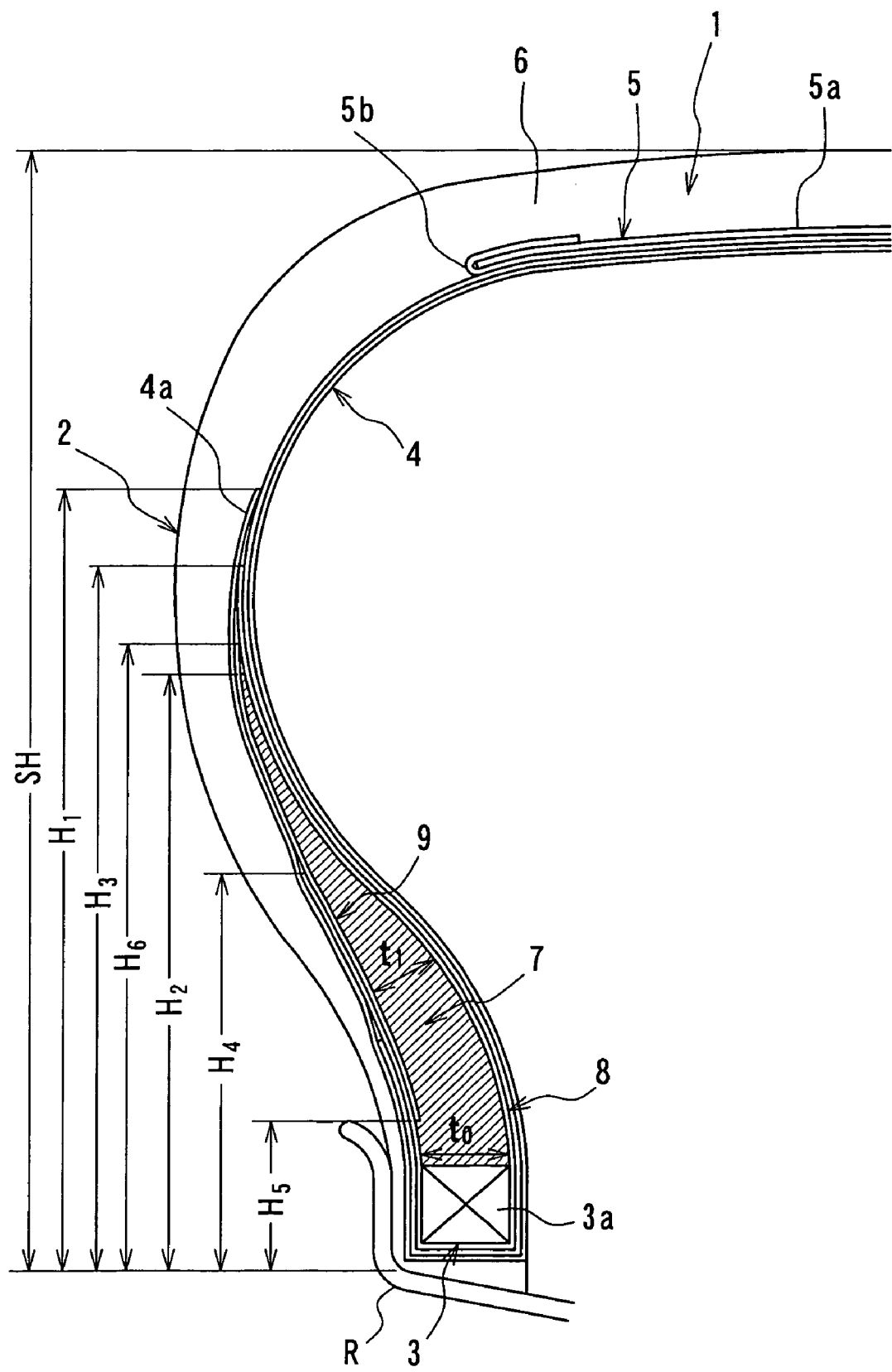
FIG. 1 is a diagrammatical view of a low-profile tire showing an embodiment of the invention.

In FIG. 1 is shown an embodiment of the high-performance, low-profile tire for four-wheeled passenger car according to the invention, wherein numeral 1 is a tread portion, numeral 2 a sidewall portion, numeral 3 a bead portion, and numeral 4 a carcass comprised of two carcass cord plies, each consisting of a main body portion extending from the tread portion 1 through the sidewall portion 2 to a bead core 3a in the bead portion 3 and a turnup portion continuing from the main body portion and wound around the bead core 3a from an inside of the tire toward an outside thereof. In the carcass 4, each of the carcass cord plies contains rubberized textile cords having a tensile strength at break of not less than 4.5 cN/dtex arranged at an angle of 70–90° with respect to the circumferential direction of the tire, and cord arranging directions of the plies are different from each other, and the carcass cord ply has a turnup end 4a at a height $H_1$ corresponding to 60–80% of a tire section height (SH).

Also, numeral 5 is a belt arranged on a tire crown portion ay a width approximately equal to a width of a tread rubber. The belt 5 is comprised of two belt layers 5a, 5b each containing rubberized textile cords having a tensile strength at break of not less than 6.0 cN/dtex arranged at an angle of 15–30° with respect to the circumferential direction of the tire, cords of which layers are crossed with each other, in which each end portion of the layer 5a located at an upper side is enclosed with an upwardly folded end portion of the layer 5b located at a lower side.

Further, numeral 6 is a tread rubber arranged outside the belt 5 in the radial direction of the tire, and numeral 7 a bead apex extending outward from the bead core 3a in the radial direction of the tire and having a tapered sectional form.

Figure 2:
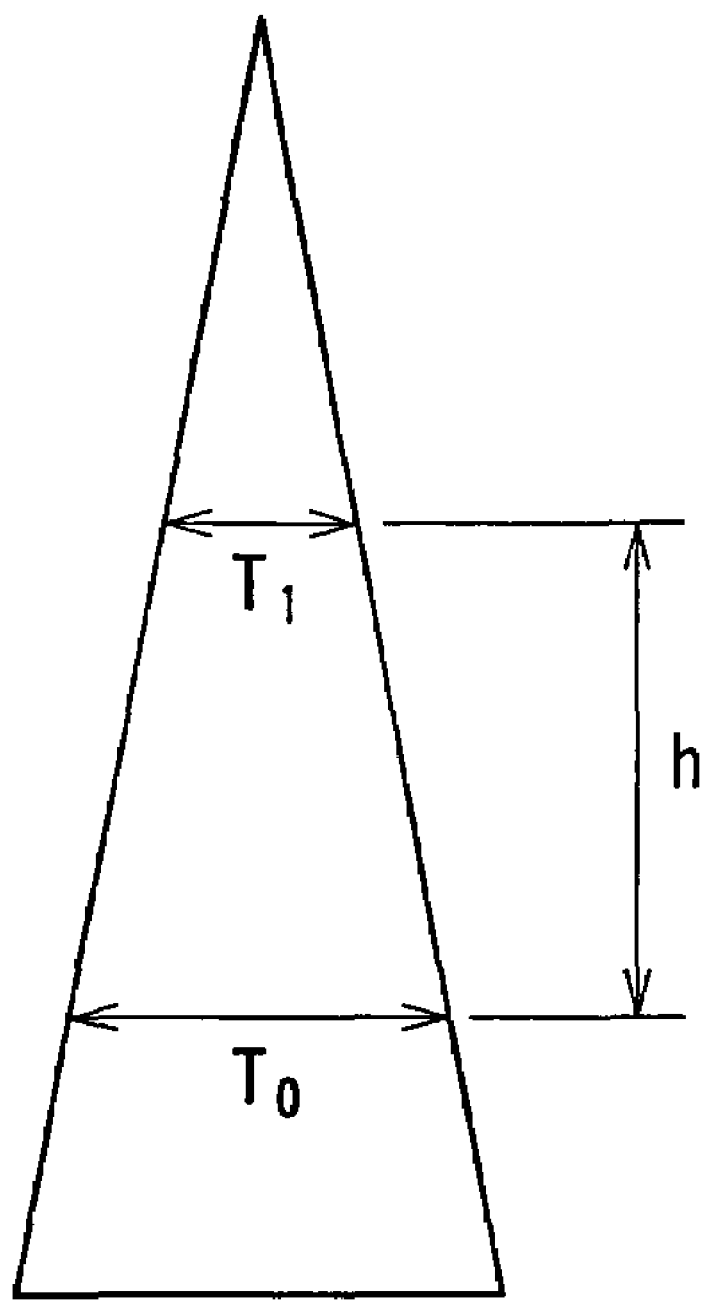
FIG. 2 is a schematically section view of a bead apex.

The bead apex 7 is a rubber having a JIS A hardness at room temperature of 75–95° and a height $H_2$ extending from an outer peripheral face of the bead core to a position corresponding to 50–70% of the tire section height (SH) but not exceeding the turnup end 4a of the carcass 4, in which a thickness $t_0$ of a lower end at a section in the radial direction of the tire is approximately equal to a width of the bead core and a thickness $t_1$ at least ranging from the lower end up to a position corresponding to 25–30% of the tire section height (SH) is 70–100% of the thickness $t_0$ of the lower end and has a thickness reducing ratio of 0–0.05% per unit height and a thickness of an upper region at least exceeding 30% of the tire section height (SH) is 70–10% of the thickness of the lower end and has a thickness ratio of 0.05–0.2% per unit height. The term "thickness reducing ratio" is defined by $|T_0-T_1|/h$ when thicknesses at two arbitrary places of the bead apex 7 are $T_0$ and $T_1$ and a size therebetween is h as shown in FIG. 2.

Numeral 8 is a flipper comprised of at least one layer of high elasticity cords arranged outside the carcass 4 in the radial direction of the tire and wound around the bead core 3a and the bead apex 7 from an inside of the tire toward an outside thereof. The flipper 8 contains rubberized textile cords having a tensile strength at break of not less than 6.0 cN/dtex arranged at an angle of 35–60° with respect to the circumferential direction of the tire, and has a radially inside end height $H_3$ corresponding to 55–75% of the tire section height (SH) and a radially outside end height $H_4$ corresponding to 25–45% of the tire section height (SH) and lower than a height of a bead-side reinforcing layer.

Further, numeral 9 is at least one bead-side reinforcing layer of high elasticity cords arranged to pass between a turnup portion of the flipper 8 and the bead apex 7 and extend up to a vicinity of a tire maximum width. The bead-side reinforcing layer 9 contains containing rubberized textile cords having a tensile strength at break of not less than 6 cN/dtex arranged at an angle of 5–45° with respect to the circumferential direction of the tire and in the same direction as the cord extending direction of the inside portion of the flipper 8, in which a lower end has a height $H_5$ approximately equal to a rim flange R and an upper end has a height $H_6$ corresponding to 50–70% of the tire section height (SH) and being lower than the turnup end 4a of the carcass 4.

In the low-profile tire having the above construction, the lateral spring constant can be properly raised while suppressing the rise of the vertical spring constant, so that not only the steering stability in the high-speed cornering but also the acceleration performance are improved.

In order to effectively develop the acceleration performance, it is particularly important that the tire is mounted on a wheel shaft of a vehicle having a negative camber alignment so that the cords in the inside portion of the flipper 8 and the bead-side reinforcing layer 9 are inclined in a direction withstanding a rotating stress applied from a road surface to the tire viewing from a side of the bead core, whereby the deformation of the tire in the driving is suppressed to ensure a sufficient peripheral length of the ground contact face.

In the invention, when the cord arranging angle in the carcass 4 is less than 70°, the rigidities of the flex zone in the circumferential and radial directions are undesirably raised in the vicinity of the carcass shoulder due to the crossing of the plies in the carcass 4, and hence the vertical spring constant of the tire rises and the ground contact area is increased by the vertical deformation of the tire in the acceleration of the vehicle and it is difficult to ensure the acceleration performance.

Also, when the height $H_1$ of the turnup end in the carcass 4 exceeds 80% of the tire section height SH, it is difficult to ensure the performances due to the decrease of the flex zone likewise the above, while when it is less than 60% of SH, the required lateral rigidity can not be ensured and the cornering performance lowers.

As to the belt 5, when the cord angle is less than 15°, the restraining force by the tread portion in the circumferential direction becomes too strong and the proper ground contact length can not be obtained in the contacting with ground and the acceleration performance is deteriorated, while when it exceeds 30°, the restraining force by the tread portion in the circumferential direction becomes weak and the expanding of the central portion of the tread through centrifugal force is increased during the high-speed running and hence the uneven wear is promoted by the rise of the ground contact pressure at such a central portion.

When the each end portion of the layer 5a located at the upper side is enclosed with the upwardly folded end portion of the layer 5b located at the lower side, it is possible to control the increase of strain at the end portion of the layer 5a (causing the separation failure) due to the enlarging of the distance between the aligned rubberized cords at such an end portion in the circumferential direction through the centrifugal force during the high-speed running.

As to the flipper 8, when the cord arranging angle with respect to the circumferential direction is less than 35°, the crossing angle with the cord in the carcass 4 becomes too large and the vertical spring constant excessively rises and it is difficult to ensure the acceleration performance, while when it exceeds 60°, the improvement of the lateral spring constant expected by the flipper 8 can not be obtained. Therefore, when the cord arranging angle in the flipper 8 is limited to a range of 35–60°, it is possible to improve the lateral spring constant and ensure the acceleration performance.

The reason why the radially inside end height $H_3$ in the flipper 8 is limited to 55–75% of the tire section height SH is based on the fact that a step of about 5% is formed to the turnup end 4a of the carcass ply in the carcass 4 to avoid air blister resulted from the stepwise difference between the end portions of the flipper and the carcass turnup portion. On the other hand, the reason why the upper limit of the radially outside end height $H_4$ in the flipper 8 is 45% of the tire section height SH is based on the fact that a stepwise difference to the bead-side reinforcing layer 9 takes at least 5%.

As to the bead-side reinforcing layer 9 not wound around the bead core 3a, the influence on the vertical spring constant is less as compared with the carcass 4 and the flipper 8. Therefore, when the cords in the bead-side reinforcing layer 9 are extended in the same direction as the cord extending direction inside portion of the flipper 8, the lateral spring constant can be selectively improved without excessively increasing the vertical spring constant.

When the height $H_5$ of the lower end of the bead-side reinforcing layer 9 is approximately equal to the rim flange of the rim R and the height $H_6$ of the upper end of thereof is 50–70% of the tire section height SH, the height in the radial direction can be gradually lowered stepwise in the order of the turnup end of the carcass 4—radially outside end of the flipper 8—upper end of the bead-side reinforcing layer, whereby it is made possible to avoid the formation of extreme rigidity difference while suppressing the occurrence of inferior product such as air blister or the like.

The bead apex 7 has naturally a function for embedding a triangular portion defined by the upper edge of the bead core 3a and the main body portion and the turnup portion of the carcass ply in the carcass 4 and takes usually a form similar to a relatively simple isosceles triangle. If only the lateral spring constant is selectively improved by using the bead apex, since the displacement in the lateral direction is caused centering around the bead core 3a, it is useful to maintain the thickness of the bead apex 7 so as to be equal to the width of the upper edge of the bead core 3a up to a certain height without simply decreasing thickness as far as possible. For this end, the thickness t of the bead apex at least from the lower end up to a position corresponding to 25–30% of the tire section height SH is made 70–100% of the thickness $t_0$ of the lower end of the bead apex and has a thickness reducing ratio of 0–0.05% per unit height.

On the other hand, the thickness of the upper region of the bead apex at least exceeding 30% of the tire section height SH is gradually decreased so as to embed the triangular portion defined between the main body portion and the turnup portion of the carcass ply. That is, the thickness of the upper region of the bead apex is made 70–10% of the thickness $t_0$ of the lower end and has a thickness reducing ratio of 0.05–0.2% per unit height, whereby the rise of the vertical spring constant is suppressed.

The tire having the above construction is preferable to be mounted on a wheel shaft of a vehicle having a negative camber alignment. In the mounting of the tire, the cords in the inside portion of the flipper 8 and the cords in the bead-side reinforcing layer 9 at least located at an inside of the tire mounted on the vehicle are inclined in a direction withstanding a rotating stress applied from a road surface to the tire viewing from a side of the bead core 3a, whereby the deformation at the inside of the tire is suppressed and the decrease of the ground contact length in the traction is controlled to improve the acceleration performance.

EXAMPLES

There are prepared tires each having a tire size of 265/40R17 and a specification shown in Table 1 (SH: 104 mm), and then the vertical spring constant and lateral spring constant of the tire are measured to obtain results as shown in Table 1.

Moreover, each of the vertical spring constant and lateral spring constant in Table 1 is represented by an index on the basis that the tire of Conventional Example 1 is 100, in which the smaller the index value, the softer the tire and the larger the index value, the harder the tire.

TABLE 1

|  | Conventional Example 1 | Conventional Example 2 | Example 1 | Example 2 |
|---|---|---|---|---|
| Cord angle of carcass (°) | 60 | 90 | 90 | 90 |
| Height of turnup end of carcass | 70% SH | 70% SH | 70% SH | 70% SH |
| Cord angle of flipper (°) | 45 | 45 | 45 | 60 |
| Height of inside portion of flipper | 62% SH | 62% SH | 62% SH | 62% SH |
| Cord angle of bead-side reinforcing layer (°) | 45 | 45 | 45 | 5 |
| Height of upper end of bead-side reinforcing layer | 56% SH | 56% SH | 56% SH | 56% SH |
| Height of bead apex | 30% SH | 30% SH | 55% SH | 55% SH |
| Thickness of bead apex at a position of 25% SH | 15% of thickness $t_0$ at lower end | 15% of thickness $t_0$ at lower end | 95% of thickness $t_0$ at lower end | 95% of thickness $t_0$ at lower end |
| Thickness reducing ratio of bead apex at a position of 25% SH | 0.14 | 0.14 | 0.01 | 0.01 |

TABLE 1-continued

|  | Conventional Example 1 | Conventional Example 2 | Example 1 | Example 2 |
|---|---|---|---|---|
| Thickness of bead apex at a position of 50% SH | — | — | 15% of thickness $t_0$ at lower end | 15% of thickness $t_0$ at lower end |
| Thickness reducing ratio of bead apex in a zone ranging up to 25–50% SH | — | — | 0.13 | 0.13 |
| Vertical spring constant (index) | 100 | 85 | 86 | 87 |
| Lateral spring constant (index) | 100 | 85 | 100 | 108 |

In the tire of Conventional Example 1, the steering stability in the high-speed cornering is good, but the vertical deformation in the acceleration is small and hence the improvement of the acceleration performance by the increase of the ground contact area can not be expected.

In the tire of Conventional Example 2, the indexes of the vertical and lateral spring constants are 85 and the improvement of the acceleration performance is expected, but the tire becomes softer in the lateral direction and hence the tire is apt to be deformed in the lateral direction during the cornering to obstruct the occurrence of the cornering force and indicate a feeling of loose steering.

In the tires of Examples 1 and 2, indexes of the lateral spring constant are 100 and 108, respectively, and the indexes of the vertical spring constant are 86 and 87, respectively, so that it is confirmed to improve both the acceleration performance and the steering stability in the high-speed cornering.

As seen from the above, according to the invention, there can be provided a low-profile tire improving both the acceleration performance and the steering stability in the high-speed cornering.

What is claimed is:

1. A high-performance, low-profile tire for four-wheeled passenger car comprising a carcass comprised of at least two carcass cord plies each having a relatively high elasticity and consisting of a main body portion extending from a tread portion through a sidewall portion to a bead core in a bead portion and a turnup portion continuing from the main body portion and wound around the bead core from an inside of the tire toward an outside thereof, a belt comprised of high elasticity cord layers arranged on an outside of the carcass in a radial direction of the tire at a width approximately equal to a tread rubber, a tread made of a tread rubber arranged on an outside of the belt in the radial direction of the tire, a bead apex extending outward from the bead core in the radial direction of the tire and having a tapered sectional form, a flipper comprised of at least one layer of high elasticity cords arranged outside the carcass in the radial direction of the tire and wound around the bead core and bead apex from an inside of the tire toward an outside thereof, and at least one bead-side reinforcing layer of high elasticity cords arranged to pass between a turnup portion of the flipper and the bead apex and extend up to a vicinity of a tire maximum width, and having an aspect ratio of 35–55%, in which each of said carcass, belt, flipper, bead-side reinforcing layer and bead apex satisfies the following conditions:

Carcass: at least two plies each containing rubberized textile cords having a tensile strength at break of not less than 4.5 cN/dtex arranged at an angle of 70–90° with respect to a circumferential direction of the tire, cord arranging directions of which plies being different from each other, and having a turnup end at a height corresponding to 60–80% of a tire section height (SH: defined by a half of a value obtained by subtracting a normal rim from an outer diameter of the tire);

Belt: at least a pair of layers each containing rubberized textile cords having a tensile strength at break of not less than 6.0 cN/dtex arranged at an angle of 15–30° with respect to the circumferential direction of the tire, cords of which layers being crossed with each other, in which each end portion of the layer located at an upper side is enclosed with an upwardly folded end portion of the layer located at a lower side;

Flipper: at least one layer containing rubberized textile cords having a tensile strength at break of not less than 6.0 cN/dtex arranged at an angle of 35–60° with respect to the circumferential direction of the tire, and having a radially inside end height corresponding to 55–75% of the tire section height and a radially outside end height corresponding to 25–45% of the tire section height and lower than a height of the bead-side reinforcing layer;

Bead-side reinforcing layer: at least one layer containing rubberized textile cords having a tensile strength at break of not less than 6 cN/dtex arranged at an angle of 5–45° with respect to the circumferential direction of the tire and in the same direction as the cord extending direction of the inside portion of the flipper, in which a lower end has a height approximately equal to a rim flange of the rim and an upper end has a height corresponding to 50–70% of the tire section height and being lower than the turnup end of the carcass;

Bead apex: rubber having a JIS A hardness at room temperature of 75–95° and a height extending from an outer peripheral face of the bead core to a position corresponding to 50–70% of the tire section height but not exceeding the turnup end of the carcass, in which a thickness of a lower end at a section in the radial direction of the tire is approximately equal to a width of the bead core and a thickness at least ranging from the lower end up to a position corresponding to 25–30% of the tire section height is 70–100% of the thickness of the lower end and has a thickness reducing ratio of 0–0.05% per unit height and a thickness of an upper region at least exceeding 30% of the tire section height is 70–10% of the thickness of the lower end and has a thickness reducing ratio of 0.05–0.2% per unit height.

2. A method of mounting a high-performance, low-profile tire for four-wheeled passenger car which comprises mounting a tire as claimed in claim 1 on a wheel shaft of a vehicle having a negative camber alignment so that the cords of the flipper inside portion and the bead-side reinforcing layer at least located at an inside of the tire mounted on the vehicle are inclined in a direction withstanding a rotating stress applied from a road surface to the tire viewing from a side of the bead core.

* * * * *